United States Patent [19]

Evans

[11] Patent Number: 5,350,467
[45] Date of Patent: Sep. 27, 1994

[54] METHOD OF HEAT TREATING A ZONE OF EACH OF A PLURALITY OF ARTICLES

[76] Inventor: Roy E. Evans, Wood Lane, Fordhouses, Wolverhampton, West Midlands WV10 8HN, United Kingdom

[21] Appl. No.: 40,929

[22] Filed: Mar. 31, 1993

[30] Foreign Application Priority Data

Apr. 2, 1992 [GB] United Kingdom ................. 9207281

[51] Int. Cl.⁵ ............................................ C21D 9/00
[52] U.S. Cl. ................................. 148/559; 148/252; 148/259; 266/130
[58] Field of Search ............... 148/559; 266/252, 259, 266/130

[56] References Cited

U.S. PATENT DOCUMENTS

| | | | |
|---|---|---|---|
| 2,470,311 | 4/1949 | Hoyler et al. | 198/209 |
| 3,821,037 | 6/1974 | Snyder et al. | 148/572 |
| 4,205,935 | 6/1980 | Edler et al. | 266/130 |
| 4,243,441 | 1/1981 | Wilson | 148/559 |
| 4,732,296 | 3/1988 | Heck et al. | 221/172 |
| 4,763,880 | 8/1988 | Smith et al. | 266/259 |
| 5,143,558 | 9/1992 | Smith | 148/559 |

FOREIGN PATENT DOCUMENTS

| | | |
|---|---|---|
| 502152 | 3/1939 | United Kingdom . |
| 631396 | 11/1949 | United Kingdom . |
| 1376026 | 12/1974 | United Kingdom . |
| 2003262A | 3/1979 | United Kingdom . |

*Primary Examiner*—Upendra Roy
*Attorney, Agent, or Firm*—Klarquist Sparkman Campbell Leigh & Whinston

[57] ABSTRACT

A method of heat treating e.g. an end zone of each of a plurality of metal articles such as fasteners comprises the steps of feeding each of the plurality of articles onto a conveyor means by which the articles are conveyed in succession in a generally upright orientation, towards and through a heat treatment apparatus where the zones are subjected to heat and conveying the articles from the heat treatment apparatus to a delivery point.

9 Claims, 2 Drawing Sheets

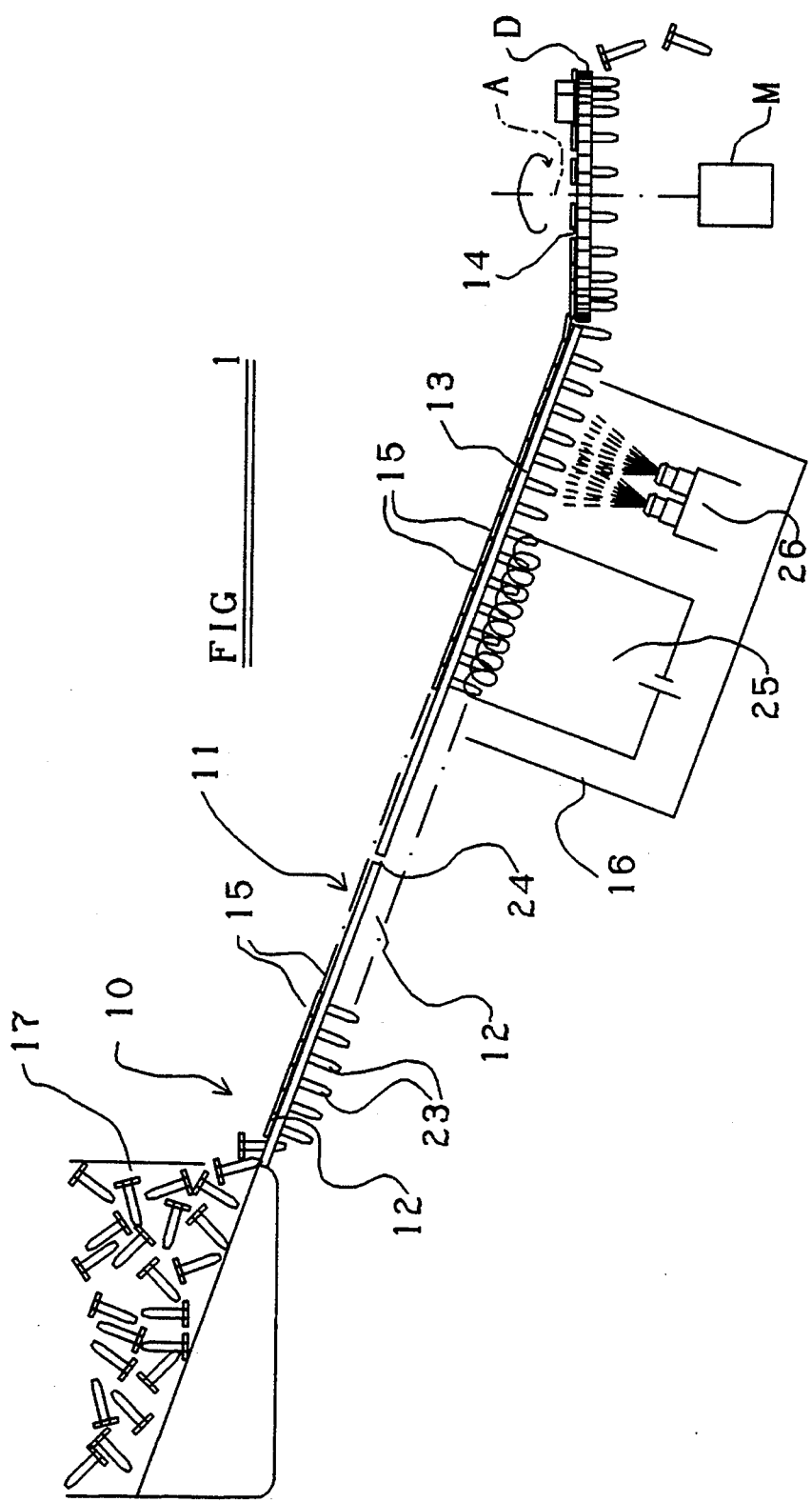

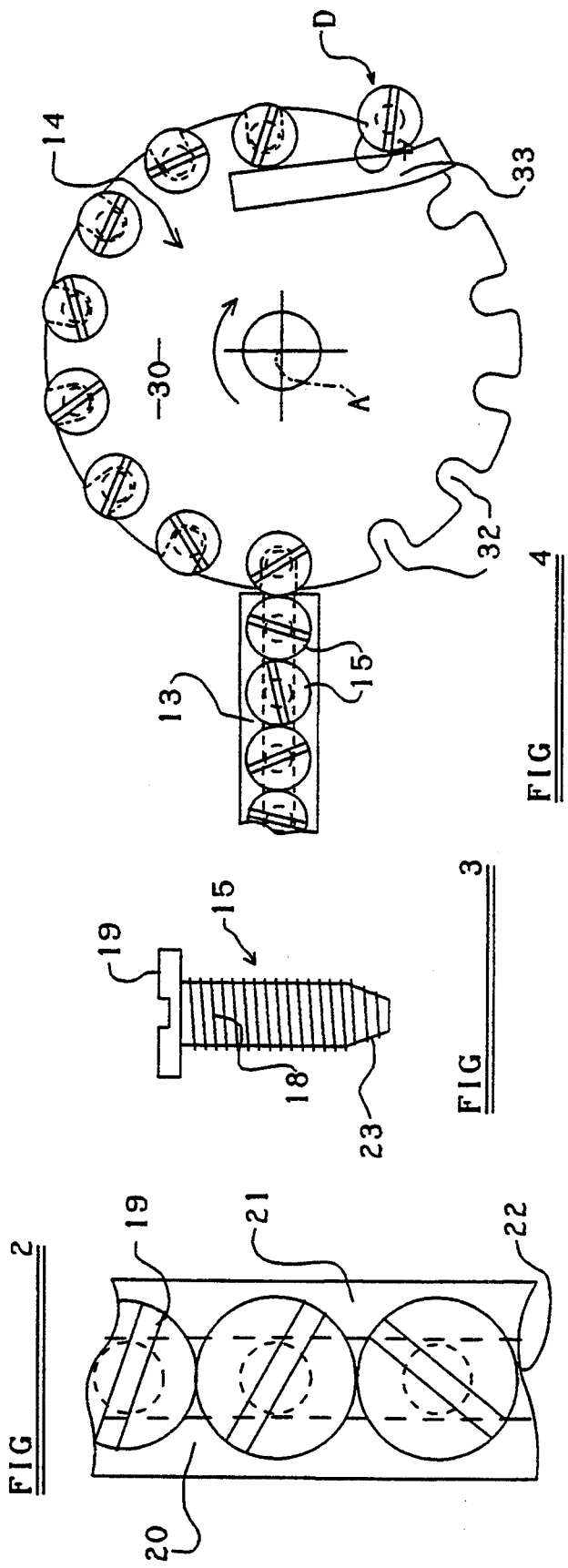

METHOD OF HEAT TREATING A ZONE OF EACH OF A PLURALITY OF ARTICLES

BACKGROUND TO THE INVENTION

Field of the Invention

This invention relates to a method of heat treating a zone of each of a plurality of articles.

It is well known to heat treat the tips of fasteners, particularly but not exclusively, so called "self threading" fasteners, to harden the tips thereof to improve the performance of the fasteners in cutting a thread in a substrate.

GB-A-1376026 discloses an apparatus in which an induction heater is utilised to perform heat treatment there being a raceway to feed the fasteners in succession, in abutting relationship, towards the induction heater. The fasteners are pushed one at a time from the raceway such that the rate at which the fasteners are fed towards the heater depends entirely upon the rate of operation of the pusher.

The dwell time of the fasteners in the heater is controlled by the rate of operation of the pusher and a feed off mechanism which together cause the fasteners to be removed one at a time from the heater and passed to a further raceway where they pass through a quenching station. The rate at which the articles pass through the quenching station is controlled by a regulator.

SUMMARY OF THE INVENTION

According to one aspect of the invention we provide a method of heat treating a zone of each article of a plurality of articles comprising the steps of feeding each of the articles onto a conveyor means by which the articles are conveyed towards and through a heat treatment apparatus, subjecting the zones of each of the articles to heat at the heat treatment apparatus, removing the articles from the conveyor means and conveying the articles to a delivery point, characterised in that the articles are conveyed in succession and in abutting relationship with one another along the conveyor means, regulating the rate at which articles are conveyed along the conveyor means towards and through the heat treatment apparatus, solely by regulating the rate at which articles are removed from the conveyor means.

Thus the invention provides in a first aspect, a dynamic method whereby a zone of each of the articles of the plurality of articles may be conveniently and economically heat treated without requiring any pusher or the like mechanism.

In a preferred arrangement, the articles are maintained in abutting relationship and conveyed along the entire extent of the conveyor means, by gravity.

The method may include quenching the zones of each of the articles immediately subsequent to heat treatment whilst the articles continue to be conveyed, whereby the end zones of the articles are hardened.

The invention is particularly applicable where the articles each comprise a head formation on a shank, and the zone which is heat treated is an end of the shank remote from the head formation.

Where the articles comprise fasteners, the shanks of each of the articles may comprise a thread formation, and the fasteners may be of the type which are able to cut their own threads when being introduced into a substrate. The method of the invention enables end zones only of the fasteners to be hardened.

It will be appreciated that although end zones of such thread cutting fasteners need to be hard so as to enable the thread to cut into the substrate, the remainder of the thread preferably is not hardened so as to give the fastener adequate strength.

The method may include feeding the articles one at a time onto the conveyor means from a bowl feeder.

The conveyor means may comprise a pair of generally parallel guide means separated by a slot, the shanks of each of the articles depending through the slot and the head formations of each of the articles abutting the guide means.

The conveyor means may be inclined to the horizontal throughout its length whereby the articles are thus conveyed along the conveyor means under gravity. Where the articles are headed fasteners the head formations slide on the guide means.

The head formations of the articles may be in abutting engagement with each other as the articles are conveyed along the conveyor means.

The conveyor means may comprise a first section which conveys the articles in succession towards the heat treatment apparatus, and a second section which conveys the articles through the heat treatment apparatus.

The articles may be removed from the second section of the conveyor means by a pick-up means which comprises a further conveyor means which conveys the articles to the delivery point.

The further conveyor means may comprise a rotatable pick-up member rotatable about a generally upright axis, and each of the articles may be collected in a respective receiving formation of the pick-up member and conveyed to the delivery point where the articles are delivered.

Where the articles are metallic, each of the zones of the articles may be subjected to heat treatment by induction heating. This may be achieved by the heat treatment apparatus comprising one or more heating coils, the zones of the articles passing in close proximity to the coils at the treatment apparatus, as they are conveyed.

The zones of the articles may be heated by the induction heating means to at least 700° C., and more preferably to at least 750° C., whereby the end zones of the articles may be heated to red heat.

Where the heated zones of each of the articles are quenched, this may be achieved by spraying cool liquid such as water, which may contain appropriate additives to control the rate of cooling, onto the heated zones, or by dipping at least the zones of the articles into cool liquid or by any other means as desired.

The conveying means, or at least that part of the conveyor means which conveys the articles through the heat treatment apparatus (e.g. the second conveyor section) may be made predominantly of an electrically and heat insulating material so as not to be affected by the heating means of the heat treatment apparatus. One suitable material is a ceramic based material.

It will be appreciated that the invention in the first aspect provides a generally dynamic method for heat treating zones of articles in which the articles are conveyed preferably under gravity, towards and through the heat treatment apparatus, so that the rate at which the articles are conveyed depends solely upon the rate at which articles are removed from the conveyor means and delivered at the delivery point.

According to a second aspect of the invention, we provide a system for performing the method of heat treating a zone of each article of a succession of articles of the first aspect of the invention, the system comprising in combination, a conveyor means for conveying the articles in succession and in abutting relationship with one another, towards and through a heat treatment apparatus, the heat treatment apparatus being adapted to subject the zone of each of the articles to heat, and the system further comprising means to remove articles from the conveyor means and convey the articles to a delivery point, at a regulated rate such that the rate at which articles are conveyed along the conveyor means towards and through the heat treatment apparatus solely depends upon the rate at which articles are removed from the conveyor means.

BRIEF DESCRIPTION OF THE DRAWINGS

The invention will now be described with reference to the accompanying drawings, in which:

FIG. 1 is an illustrative side view of a system for use in performing the method of the invention, FIG. 2 is an enlarged illustrative plan view of part of the system of FIG. 1, FIG. 3 is an enlarged illustrative side view of an article for treatment by the method of the invention.

FIG. 4 is an enlarged illustrative plan view of another part of the system of FIG. 1.

DESCRIPTION OF THE PREFERRED EMBODIMENTS

Referring to the drawings, a system 10 for hardening by heat treatment the ends of each of a plurality of metal fasteners comprises a conveyor means 11 having a first conveyor section 12, and a second conveyor section 13, for conveying each of the fasteners, some of which are indicated at 15 in FIG. 1, in succession towards and through a heat treatment apparatus 16 and a further conveyor 14 is provided to convey the fasteners 15 from the second conveyor section 13 to a delivery point D.

The fasteners 15 are stored in a bowl feeding apparatus 17 from where the fasteners are fed one at a time onto the first conveyor section 12.

The fasteners 15 each comprise a shank 18 and a head formation 19 and the conveyor section 12 comprises a pair of guide rails 20,21, with a slot 22 therebetween, the slot 22 being dimensioned such that the shanks 18 of the fasteners 15 can extend therethrough with the head formations 19 retained by the guide rails 20,21, so that the fasteners are conveyed in a generally upright orientation with the ends 23 of the fasteners 15 depending from the conveyor section 12.

The guide rails 20,21, of the conveyor section 12 slope downwardly from the bowl feeder apparatus 17 at an angle of about 30° to the horizontal, and the fasteners 15 are thus conveyed under gravity with their head formations 19 maintained in abutting engagement with each other to form a row or succession of fasteners 15.

The second conveyor section 13 is similarly constructed to conveyor section 12 and the fasteners 15 are transferred from the first conveyor section 12 to the second conveyor section 13 at point 24 where the guide rails 20,21, of the first and second conveyor sections lie adjacent to one another.

The guide rails 20,21, of the first conveyor section 12 are made of metal and are smooth so that the head formations 19 of the fasteners can slide relative to the guide rails 20,21. If necessary, the guide rails 20,21, could be provided with a lubricating coating to facilitate sliding.

The guide rails of the second conveyor section 13 are also smooth to permit sliding between the head formations 19 and the guide rails, but the guide rails are made of a heat resistant and insulating ceramic material for a purpose hereinafter explained. By means of the second conveyor section 13, each of the fasteners 15 is conveyed, in succession, through a heat treatment apparatus 16.

The treatment apparatus 16 includes a heating means comprising in this example an induction heater 25 which has one or more coils close to which the ends 23 of each of the fasteners 15 pass as they are conveyed by the conveyor section 13. The ends 23 of the fasteners, being metal, are thus heated. However, because of the short duration for which the ends 23 are subjected to heat, and because the guide rails of the second conveyor section 13 are made of a heat resistant and insulating material, only the ends 23 of the fasteners 15 are significantly heated and there is little heating effect on the remainder of each of the fasteners 15. However the induction coil or coils of the heater 25 preferably carry sufficient current to cause the ends 23 to be heated to red heat i.e. between 750° and 850° C., but at least 700° C.

Immediately after being conveyed past the heater 25, the fasteners 15 each pass a quenching means which in this example comprises a liquid spray 26 which directs cool liquid onto the heated ends 23 of the fasteners 15 to quench them. In this way, the ends 23 of the fasteners 15 become hardened.

The cooling liquid is preferably water, with additives as appropriate to ensure a controlled cooling rate.

The further conveyor 14 comprises a continuously rotatable pick-up member 30 driven for example by a variable speed motor M, the member 30 having at its circumference 31 a plurality of receiving formations 32 each of which is adapted to collect a fastener 15 from the second conveyor section 13, again with each of the fasteners 15 in a generally upright orientation, and deliver the fasteners 15 to the delivery point D, where the fasteners 15 are removed from the conveyor 14. This can be achieved for example by the fasteners 15 being brought into engagement with an abutment 33 which is stationary relative to the rotatable pick-up member 30 so that the fasteners 15 are urged out of their respective receiving formation 32 and are permitted to fall into a collector (not shown) below.

It will be appreciated that the rate at which fasteners 15 can be fed from the bowl feeder 17 onto the first conveyor section 12 is determined entirely by the rate at which the fasteners 15 are collected from the second conveyor section 13 by the pick-up member 30 and delivered to the delivery point D, because the head formations 19 of the fasteners all abut one another throughout the length of the first and second conveyor sections 12,13 due to gravity. Thus the rate at which the fasteners 15 are conveyed to and through the heat treatment apparatus 16 is dependent solely upon the rate at which articles are removed from the second conveyor section 13, and can be adjusted by changing the rotational speed of the pick-up member 30 about its rotational axis A, thus to regulate the rate at which the fasteners 15 are removed from the second conveyor means 13.

Various modifications may be made without departing from the scope of the invention.

If desired, the conveyor means 11 may comprise a single conveyor section rather than first and second sections 12, 13.

In the system described, the fasteners 15 are retained in a bowl feeder 17 prior to being fed onto the conveyor means 11. Any other means for storing a plurality of fasteners and feeding the fasteners one at a time onto the conveyor means 11 could alternatively be provided.

Although as described, the fasteners 15 are conveyed along the entire extent of the conveyor means 11 under gravity, in another arrangement the conveyor means 11 could comprise means actively to convey the fasteners 15 in succession with the fasteners in abutting relationship with one another, along the conveyor means 11, the conveyor means 11 having suitable drive apparatus to drive the fasteners 15 towards and through the treatment apparatus 16, in their generally upright orientations as described.

Although in the example described, heating of the ends 23 of the fasteners 15 is achieved by an induction heater, any other heater suitable for this purpose could be provided. For example, the ends 23 of the fasteners 15 could be heated by a laser beam or by any other means which enables the ends of the fasteners 15 to be subjected to significant heat. Thus the fasteners need not be metallic.

In the method described, quenching is achieved by spraying cool liquid onto the ends 23 of the fasteners 15 although in another arrangement, quenching may be achieved by dipping the ends 23 of the fasteners 15 into a reservoir of cool liquid, or subjecting the ends 23 of the fasteners to a blast of cold air or other gas.

Particularly where the conveyor means 11 comprises a means positively to drive the fasteners through the heat treatment apparatus 16, the pick-up member 30 may not be required. However, where the fasteners 15 are conveyed under gravity by a conveyor means 11 similar to that described, any alternative pick-up member to collect fasteners and deliver them to a delivery point could alternatively be provided.

Although the invention has been described with reference to the heat treatment of ends 23 of fasteners 15 each of which comprises a shank 18 and a head formation 19, it will be appreciated that the invention may be applied to the heat treatment of an end zone of any other appropriate article.

Further alternatively, the method of the invention may be applied to the heat treatment of a selected zone along each of a plurality of elongate metal articles, for example a zone along the shanks of each of the plurality of articles intermediate the ends thereof.

I claim:

1. A method of heat treating a zone of each article of a plurality of articles comprising the steps of feeding each of the articles onto a conveyor means by which the articles are continuously conveyed towards and through a heat treatment apparatus, subjecting the zones of each of the articles to heat at the heat treatment apparatus, removing the articles from the conveyor means and conveying the articles to a delivery point, wherein the articles are conveyed in succession and in abutting relationship with one another along the conveyor means, regulating the rate at which articles are conveyed along the conveyor means towards and through the heat treatment apparatus solely by regulating the rate at which articles are removed from the conveyor means.

2. A method according to claim 1 wherein the articles are maintained in abutting relationship and conveyed along the entire extent of the conveyor means, by gravity.

3. A method according to claim 1 wherein each article comprises a head formation on a shank, and the zone which is heat treated is an end of the shank remote from the head formation.

4. A method according to claim 1 wherein the conveyor means is inclined to the horizontal at least substantially throughout its length whereby the articles are conveyed along the conveyor means under gravity.

5. A method according to claim 1 wherein the conveyor means comprises a first section which conveys the articles in succession towards the heat treatment apparatus and a second section which conveys the articles through the heat treatment apparatus.

6. A method according to claim 1 wherein the articles are removed from the conveyor means by a further conveyor which conveys the articles to the delivery point, the further conveyor comprising a rotatable pick-up member which is rotatable about a generally upright axis, each of the articles being collected in a respective receiving formation of the pick-up member and conveyed to the delivery point where the articles are delivered.

7. A method according to claim 1 wherein that part of the conveyor means which conveys the articles through the heat treatment apparatus is made predominantly of an electrically and heat insulating material.

8. A method according to claim 3 wherein the articles are conveyed one at a time onto the conveyor means from a bowl feeder.

9. A method according to claim 3 wherein the conveyor means comprises a pair of generally parallel guide means separated by a slot, the shanks of each of the articles depending through the slot and the head formations of each of the articles abutting the guide means.

* * * * *